United States Patent [19]

De Loach, Jr.

[11] 4,064,458

[45] Dec. 20, 1977

[54] ELECTROMAGNETIC WAVE COMMUNICATION SYSTEMS

[75] Inventor: Bernard Collins De Loach, Jr., Murray Hill, N.J.

[73] Assignee: S. Sherman, New Providence, N.J.; a part interest

[21] Appl. No.: 420,166

[22] Filed: Nov. 29, 1973

Related U.S. Application Data

[63] Continuation-in-part of Ser. No. 254,445, May 18, 1972.

[51] Int. Cl.² .......................... H04B 7/24; G01S 9/02
[52] U.S. Cl. ........................................ 325/54; 178/86; 325/308; 343/7 VM

[58] Field of Search .............. 325/54, 308; 343/5 PD, 343/5 R, 112 CA, 112 D, 7 ED, 225, 7 VM; 331/107 G, 107 R; 178/DIG. 13, 5.1, 86; 340/32

[56] References Cited

U.S. PATENT DOCUMENTS 3,098,225  7/1963  Anderson ........................ 343/112 D

*Primary Examiner*—Maynard R. Wilbur
*Assistant Examiner*—Richard E. Berger
*Attorney, Agent, or Firm*—S. Sherman

[57] ABSTRACT

The proper utilization of that portion of the millimeter wave spectrum that is particularly highly absorbed by the atmosphere is shown in conserve frequency spectrum while permitting a high density of users operating in relatively close proximity.

1 Claim, 4 Drawing Figures

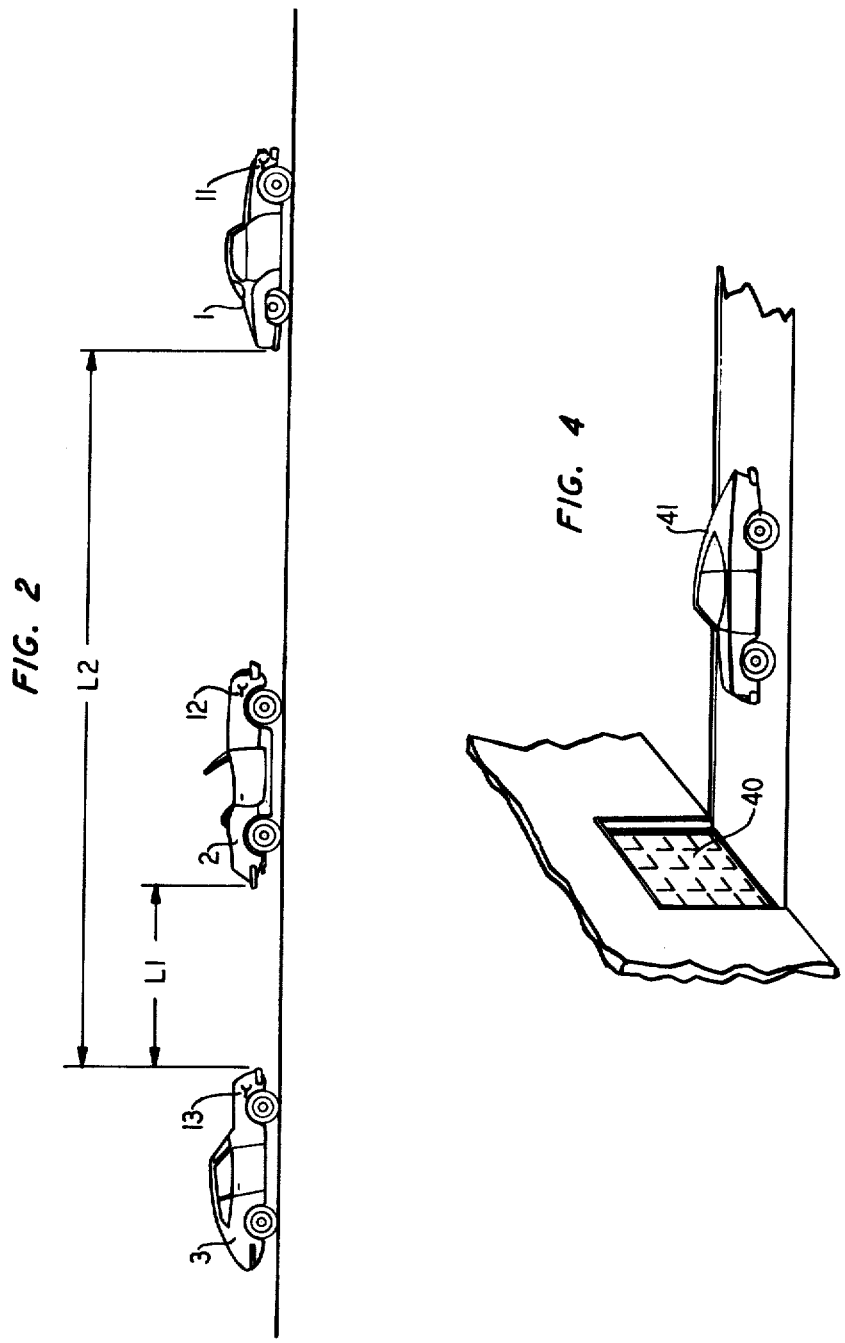

ELECTROMAGNETIC WAVE COMMUNICATION SYSTEMS

This application, which is a continuation-in-part of my copending application Ser. No. 254,445, filed May 18, 1972, relates to unguided electromagnetic wave communication systems wherein there are a high density of users in close proximity.

There has been much recent interest in the application of electromagnetic wave techniques to the solution of a variety of problems such as civil aviation security, crash sensors, automatic braking devices, vehicular location systems and others. Many of these applications, such as, for example, crash sensors for use in automobiles, involve a high density of users in relatively close proximity. In such cases, it becomes readily apparent that means must be provided to minimize crosstalk in order to avoid spurious indications of a crash situation when, in fact, none exists. The obvious solution to this problem is to provide a separate channel for each user. However, with millions of vehicles on the road, this approach would consume an undue amount of frequency spectrum and, as such, is not an attractive solution to the problem. Nor would it be economically feasible to incorporate sophisticated circuitry into such devices as a means of avoiding the problem of spurious indications if, indeed, it could be done at all. Obviously, if these problems are to be resolved it must be done in an economic manner, economic in both cost and in the use of the available frequency spectrum.

SUMMARY OF THE INVENTION

In accordance with the present invention, the above referred to economies are realized by operating solely at a transmission frequency that is highly attenuated by the atmosphere. For purposes of the present invention, highly attenuated shall be understood to mean that the absorption loss through the atmosphere is about 10 db per kilometer or greater. This would include, for example, the band of frequencies between 55 to 63 gigahertz. In particular, by transmitting at a carrier frequency of 60 gigahertz, maximum attenuation by the oxygen in the atmosphere is realized, significantly reducing the opportunity for crosstalk. More generally, an electromagnetic communication system, in accordance with the present invention, comprises one or more transmitters and receivers communicating through the atmosphere, and operating solely at a transmitted carrier frequency that is highly attenuated by at least one of the constant components of the atmosphere.

It is an advantage of the invention that it conserves spectrum by permitting the reuse of the same frequency in situations which would normally require a plurality of different frequencies.

It is another advantage of the invention that it reduces crosstalk and multiple path interference to such an extent that, for the very first time, it makes vehicular collision avoidance a system practical.

These and other objects and advantages, the nature of the present invention, and its various features, will appear more fully upon consideration of the various illustrative embodiments now to be described in detail in connection with the accompanying drawings.

BRIEF DESCRIPTION OF THE DRAWINGS

FIG. 2 illustrates a first application of the principles of the present invention in connection with vehicular control systems;

FIG. 4 illustrates a third application of the present invention in connection with remote controlled garage doors.

DETAILED DESCRIPTION

In the design of an electromagnetic wave transmission system of any type, one of the most important considerations is the operating frequency. This is typically chosen with great care to have the lowest loss in the transmission medium, and for obvious reasons. A high loss requires the use of many repeaters and, ultimately, very low noise, sensitive receivers. There are, however, a variety of situations where efficient transmission can be a disadvantage. These typically involve situations where transmission is through the atmosphere, distances are relatively short, and there is a high density of users. For example, in a high density system with efficient transmission, the signal of any one user would have the potential of covering a much larger area than the user requires. Thus, to avoid crosstalk, each user would require a different operating frequency. To conserve spectrum, the frequencies would have to be closely spaced, requiring highly selective receivers, which, in turn, would be relatively expensive.

Figure 1:
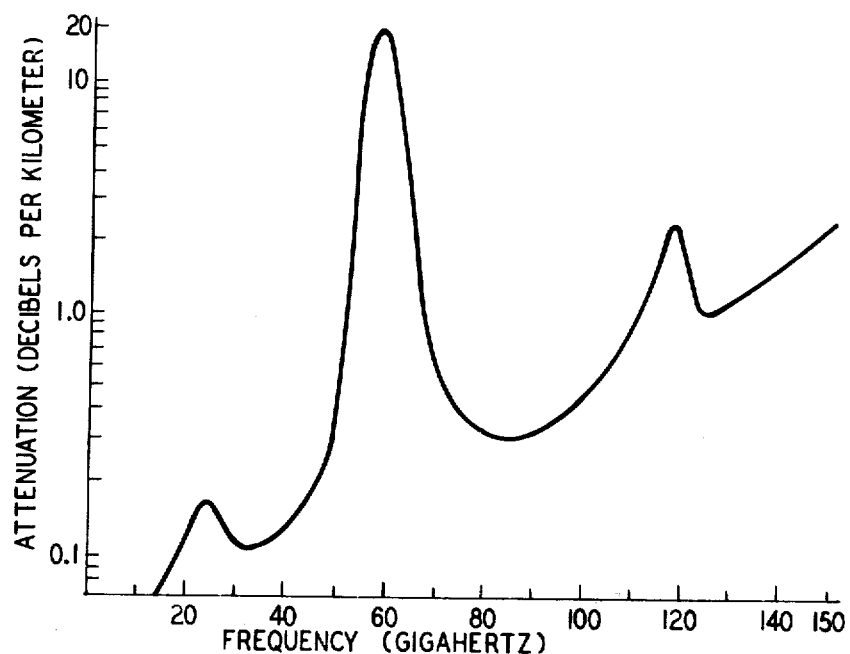
FIG. 1 shows the attenuation of radiant energy by oxygen as a function of frequency.

The present invention avoids all of these related complications by operating solely within a band of frequencies for which transmission through the atmosphere is very lossy. For example, FIG. 1 derived from an article entitled "Millimeter-Wave Communication through the Atmosphere", by D. C. Hogg, published in the Jan. 5, 1958 issue of *Science*, pages 39–46, shows the attenuation in decibels per kilometer as a function of frequency for transmission through the atmosphere. It will be noted that the attenuation peaks to approximately 20 db per kilometer at about 60 gigahertz due to absorption by oxygen. Since oxygen is a relatively constant component of the atmosphere, the range of radiation system operating at or near 60 gigahertz would be severely restricted. This, in turn, would permit multiple use of this same band of frequencies with great conservation of spectrum. In addition, the opportunity for crosstalk and multiple path interference would be greatly reduced. The following discussion is illustrative of some of the variety of applications to which the principles of the present invention are applicable.

Referring again to the drawings, FIG. 2 shows a first application of the principles of the present invention to motor vehicular control. Specifically, the object is to provide each motor vehicle operator with information as to the movements of the motor vehicles immediately ahead and/or behind him. In particular, a change in the speed of any one of these vehicles is of importance on a high speed, highly congested parkway. Accordingly, each of the vehicles 1, 2 and 3, is equipped with a forward looking radar 11, 12 and 13. While not shown, each can also be equipped with backward looking radars as well. Except for the frequency of operation, these can be any of the well-known Doppler radars currently used by the police to detect speeding violations, or devices of the type described in U.S. Pat. Nos. 2,841,782; 2,584,509; 2,891,243 and 3,383,678. Also see, "Radar Car Control Systems Point Way to Automated Travel," published in the Jan. 17, 1972 issue of *Electronics*, page 54.

Each radar in each vehicle monitors the movements of the vehicles immediately ahead and indicates their relative speeds. Means, such as a speed indicator, can be used for this purpose. In addition, other means, such as a buzzer or a light, can be used to supplement the speed indicator whenever a change in relative speed is detected, thus warning the operator to take appropriate action. In a more sophisticated arrangement, this action can be taken automatically. It should be noted, at this point, that the present invention is not concerned with the details of either the radar or any other apparatus associated with this radar. The present invention is directed solely to the means for conserving frequency spectrum and avoiding crosstalk from sources other than the sources of interest. For example, in the instant embodiment of the invention, the object is to obtain reliable information about the vehicles immediately ahead. Specifically, spurious signals due to distant reflections, that arrive during a subsequent scan of the radar, are to be avoided. Also overloading of the radar receiver, due to signals from other vehicles proceeding in either the same direction, or from vehicles proceeding in the opposite direction, must be avoided. If, for purposes of illustration, radar 13 is designed in the usual manner, it would typically operate at a carrier frequency that propagates through the atmosphere with little attenuation. Designating the distance between vehicles 1 and 2 as $L_{12}$, and the distance between vehicles 1 and 3 as $L_{13}$, the reflected signals $E_{121}$ and $E_{131}$, from cars 2 and 3, respectively, returned to radar 13 would be attenuted at least an amount proportional to the square of the round trip distance. That is, the respective losses $e_{121}$ and $e_{131}$ would be $$e_{121} = a_1(2L_{12})^2 \qquad (1)$$

and $$e_{131} = a_1(2L_{13})^2 \qquad (2)$$

where $a_1$ is a constant.

By contrast, in accordance with the present invention, the return signal is further attenuated due to absorption by oxygen in the atmosphere. In particular operating solely at a frequency of about 60 gigahertz, the signals $E_{121}$ and $E_{131}$ experience an additional round trip loss of $2L_{12}a_2$, and $2L_{13}a_2$, respectively, where $a_2$ is the attenuation per unit distance due to the absorption of 60 gigahertz radiation by oxygen. Thus, signals reflected from more distant vehicles experience additional attenuation. In particular, the reflected signal from a vehicle as little as 500 meters away is attenuated an additional 20 db by virtue of the use of a 60 gigahertz carrier frequency. This effectively limits the range of each radar to the vehicles of primary interest, and greatly minimizes the potential for receiving spurious signals from more distant vehicles.

In accordance with the prior art, one way to screen out spurious signals emanating from other vehicles would be to operate each radar at a different frequency. Alternatively, they could all operate at the same frequency, and use a coherent phase detector to distinguish the one desired signal, i.e., the only coherent signal, from among the plurality of other, incoherent signals. This arrangement would be feasible provided the number and intensity of such other signals are such as not to overload the radar receiver. The possibility of such overloading is significantly reduced, in accordance with the present invention, by operating at a carrier frequency which is rapidly attenuated by the atmosphere, thus limiting the number of spurious signals that can reach any one receiver, and also reducing the intensity of these signals. Accordingly, by operating at or near 60 gigahertz, (a) the reception of coherent, but spurious reflected signals from distant vehicles is essentially avoided, and (b) the number and the intensity of incoherent signals received are greatly reduced. This has the added advantge of permitting the use of the same band of carrier frequencies by all vehicular radars while still maintaining a high degree of operational reliability.

The operation of vehicular radar systems of the type described hereinabove is also adversely affected by clutter from stationary objects such as fences, trees and road signs. In an article entitled "Harmonic Radar Helps Autos Avoid Collisions," by J. Shefer and R. J. Kelensch, appearing in the May 1973 issue of *Spectrum*, published by the *Institute of Electrical and Electronic Engineers*, pages 38–45, there is described a collision avoidance radar system which seeks to reduce the effects of clutter by operating the radar receiver at the second harmonic of the transmitted frequency. Such a system requires that each vehicle be equipped with a passive harmonic reflector that returns efficiently only the second harmonic of the transmitted signal. The advantage of such a system is that clutter is significantly eliminated inasmuch as the sources of clutter, i.e. signs and other stationary objects, do not produce radar echoes at the second harmonic.

The principles of the present invention can readily be applied to such as harmonic radar system. If, for example, the radar transmits at 60 gigahertz, the return signal is at 120 gigahertz. While the latter frequency is not as heavily attenuated as the transmitted 60 gigahertz frequency, the reflected signal is typically very much weaker than the transmitted signal and, hence, less attenuation is required to avoid deleterious interference effects.

While an harmonic radar system has the above-noted advantages, it also has a number of disadvantages. For example, it requires that every vehicle be equipped with a passive harmonic reflector at both front and rear, If, however, a vehicle is stalled across a road, such as at an intersection, neither reflector would be exposed to oncoming traffic and neither would return a signal. In this condition, an approaching vehicle would have no warning of the stalled vehicle. Similarly, other obstacles such as fallen trees, would provide no warning to an approaching car. Accordingly, a radar system that both transmits and receives at the same frequency within the band between about 55 to 63 gigahertz, and requires no special harmonic reflectors, would appear to have some advantages and may be preferred.

In U.S. No. Pat. 3,098,225, there is described a distance measuring device which measures the absorption or attenuation of electromagnetic waves or radiations, To make this measurement, in accordance with the teachings of this patent, two signals are transmitted. One of these signals is a fixed frequency radiating at the frequency of an atmospheric absorption line having a known rate of attenuation and the other operates at a different fixed frequency outside any known absorption lines. Since the operation of such a device requires radiation at a frequency outside any known absorption lines, it is subject to all of the limitations inherent in the prior art noted hereinabove. For example, such a distance measuring device could not be conveniently used as a crash indicator on motor vehicles, nor could it be conveniently used in close proximity with other like devices without the danger of confusion due to crosstalk.

By contrast, a distance measuring system in accordance with the present invention operates solely at a frequency within the atmospheric absorption band and, as such, its range of operation is correspondingly limited.

Figure 3:
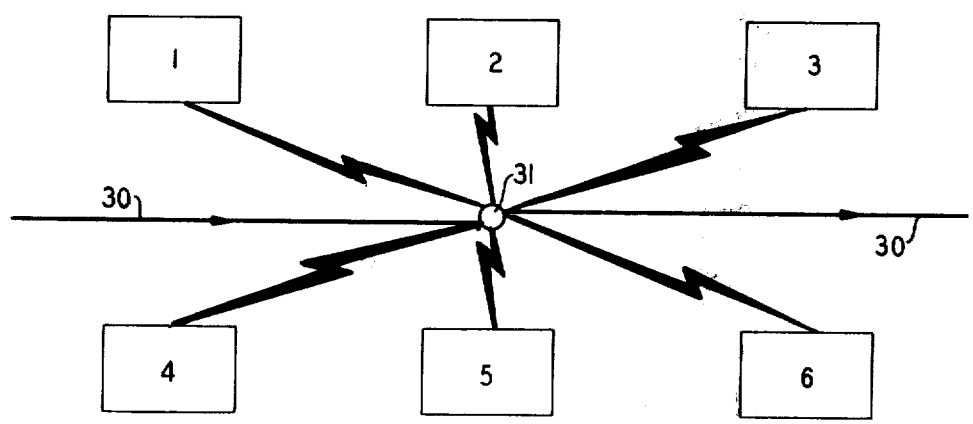
FIG. 3 illustrates a second application of the principles of the present invention in connection with CATV systems.

FIG. 3 shows a second application of the invention comprising a cable television system (CATV) wherein a plurality of television channels are distributed throughout an area by local distribution stations. Specifically FIG. 3 shows the main distribution wavepath 30, which can be a cable, feeding a local transmitter 31 situated, for example, on a street light pole. Transmitter 31 is equipped with a plurality of directional antennas which feed the CATV programs to an equal plurality of homes. For purposes of illustration, six homes 1-6 are shown.

Such a system requires first that the signals be received only by subscribers. Accordingly, the distribution antennas are directional. Further assurance that the signals will be confined to the immediate area is provided by transmitting solely at a frequency that is highly attenuated by the atmosphere. Thus, in accordance with a preferred embodiment of the present invention, each of the television channels modulates a 60 gigahertz carrier frequency signal which is then transmitted by the distribution transmitter 31 to each of the subscribers.

In addition to insuring privacy, the use of a highly attenuated carrier insures that other subscribers located a distance away, and serviced by other local transmitters, will not be interfered with by signals from transmitter 31.

It will also be recognized that in each instance, the use of highly absorbed millimeter waves also minimizes interaction among systems. Thus, in addition to providing an effective means of controlling vehicular travel, the application of the principles of the present invention to other system, such as CATV, greatly reduces the probability that either system will interfere with any other system.

The common complaint that airplanes passing overhead often actuate remote controlled garage doors suggests a third specific application of the present invention. FIG. 4 shows the well-known remote controlled garage door 40, being opened in response to a signal broadcast from an automobile 41. To aviod actuating the garage door in response to spurious signals from either other remote control sources, or from totally unrelated signal sources, such systems, in accordance with the present invention, are operated solely at a carrier frequency that is absorbed by the atmosphere. Since the demsity of users in this application is unpredictable, such systems can be operated advantageously at about 60 gigahertz or anywhere within the band between 55 to 63 gigahertz. While the absorption is less at the band edges, these frequencies lie within a band not generally used by aircraft for communication purposes and, hence, will result in reduced intersystem interference. The added attanuation at these frequencies will also result in a corresponding reduction in interference among other remote controlled garage door systems.

In the discussion hereinabove, the specific frequency of 60 gigahertz was mentioned since the absorption by oxygen peaks at about this frequency. It will be recognized, however, that the advantages of the present invention can also be realized by operation, more generally, at any frequency for which the attenuation is about 10 db km or more.

It is also apparent that the use of highly absorbed millimeter waves can be advantageously employed in many other situations. To mention but a few, such waves can be used by the military to confine radio communications to within a compound or, on a battle field, to within a very limited area. Such waves can also be employed in vehicular location systems designed to monitor vehicular movement along highways and through tunnels for traffic control purposes. In all such cases, the result is to permit the multiple use of the same carrier frequency by limiting the area covered by the transmission. Unlike optical signals, 60 gigahertz millimeter waves can penetrate fog and can be cheaply and easily generated by means of IMPATT and Gunn effect devices. Apparatus designed to operate in this general range of frequencies are well known. thus, in all cases it is understood that the above-described arrangements are illustrative of but a small number of the many possible specific embodiments which can represent applications of the principles of the invention. Numerous and varied other arrangements can readily be devised in accordance with these principles by those skilled in the art without departing from the spirit and scope of the invention.

I claim:
1. A cable television system, including;
    a plurality of signal sources located within the atmosphere for radiating electromagnetic wave energy into the atmosphere solely within the band of frequencies between 55 and 63 gigahertz;
    and a multiplicity of groups of signal receivers located within the atmosphere for receiving said radiated wave energy, where a different group of said receivers is associated with a different one of said plurality of signal sources.

* * * * *